(12) United States Patent
Carl

(10) Patent No.: US 8,516,713 B2
(45) Date of Patent: Aug. 27, 2013

(54) ILLUMINATED TAPE MEASURE

(75) Inventor: Ross Carl, River Forest, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 186 days.

(21) Appl. No.: 13/106,062

(22) Filed: May 12, 2011

(65) Prior Publication Data

US 2012/0285030 A1     Nov. 15, 2012

(51) Int. Cl.
*G01B 3/10* (2006.01)
(52) U.S. Cl.
USPC ............................................ 33/760; 33/770
(58) Field of Classification Search
USPC ................................ 33/759, 760, 768, 770
See application file for complete search history.

(56) References Cited

U.S. PATENT DOCUMENTS

| | | | |
|---|---|---|---|
| 2,804,538 A | 8/1957 | Leone | |
| 4,580,347 A * | 4/1986 | McKnight | 33/760 |
| 4,944,097 A * | 7/1990 | Kang | 33/760 |
| 5,379,524 A * | 1/1995 | Dawson | 33/768 |
| 6,030,091 A * | 2/2000 | Li | 33/760 |
| 6,108,926 A * | 8/2000 | Fraser et al. | 33/768 |
| 6,449,866 B1 | 9/2002 | Murray | |
| 7,398,604 B2 | 7/2008 | Murray | |
| 7,536,804 B2 * | 5/2009 | Chang | 33/760 |
| 7,584,548 B2 | 9/2009 | Nielson | |
| 2003/0000099 A1* | 1/2003 | Wang | 33/760 |
| 2004/0237326 A1* | 12/2004 | Wang | 33/760 |
| 2009/0307920 A1* | 12/2009 | Schrage | 33/760 |
| 2012/0285030 A1* | 11/2012 | Carl | 33/760 |

FOREIGN PATENT DOCUMENTS

EP     1789751 B1     12/2008

* cited by examiner

*Primary Examiner* — Yaritza Guadalupe-McCall
(74) *Attorney, Agent, or Firm* — McAndrews, Held & Malloy, Ltd.

(57) ABSTRACT

A tape measure includes a housing having an opening and a measuring tape retractably carried within the housing and extendable via the opening. A locking mechanism is provided for maintaining the measuring tape in an extended position relative to the housing and the locking mechanism includes a lock actuator that is mounted to the housing. An illumination device is incorporated into the lock actuator. The illumination device includes a light emitting diode (LED) wherein the light emitting diode may be arranged on the locking mechanism to illuminate the measuring tape in an area adjacent to the opening and a user activatable switch for causing power to be selectively provided to the LED wherein the user activatable switch is mounted to an exterior surface of the lock actuator.

12 Claims, 2 Drawing Sheets

ILLUMINATED TAPE MEASURE

BACKGROUND

Locking tape measures are know in the art as exemplified by U.S. Pat. No. 7,398,604 and U.S. Pat. No. 6,449,866. Additionally, illuminated tape measures are known in the art as exemplified by U.S. Pat. Nos. 2,804,538, 7,584,548, and EP Publication No. 1,789,751.

While the tape measure described in these publications, which are incorporated herein by reference in their entirety, generally work for their intended purpose, disclosed hereinafter is an improved tape measure, particularly a tape measuring having an illuminating device incorporated into a blade lock actuator.

SUMMARY

The subject disclosure is directed to an improved, illuminated tape measure. More particularly, the tape measure includes a housing having an opening and a measuring tape retractably carried within the housing and extendable via the opening. A locking mechanism is provided for maintaining the measuring tape in an extended position relative to the housing and the locking mechanism includes a lock actuator that is mounted to the housing. An illumination device is incorporated into the lock actuator. The illumination device includes a light emitting diode (LED) wherein the light emitting diode may be arranged on the locking mechanism to illuminate the measuring tape in an area adjacent to the opening and a user activatable switch for causing power to be selectively provided to the LED wherein the user activatable switch is mounted to an exterior surface of the lock actuator. A better understanding of the objects, advantages, features, properties and relationships of the subject tape measure will be obtained from the following detailed description and accompanying drawings which set forth illustrative, preferred embodiments indicative of the various ways in which the principles of the invention may be employed.

BRIEF DESCRIPTION OF THE DRAWINGS

For a better understanding of tape measure embodiments described hereinafter reference may be had to the following drawings in which.

DETAILED DESCRIPTION

Figure 1:
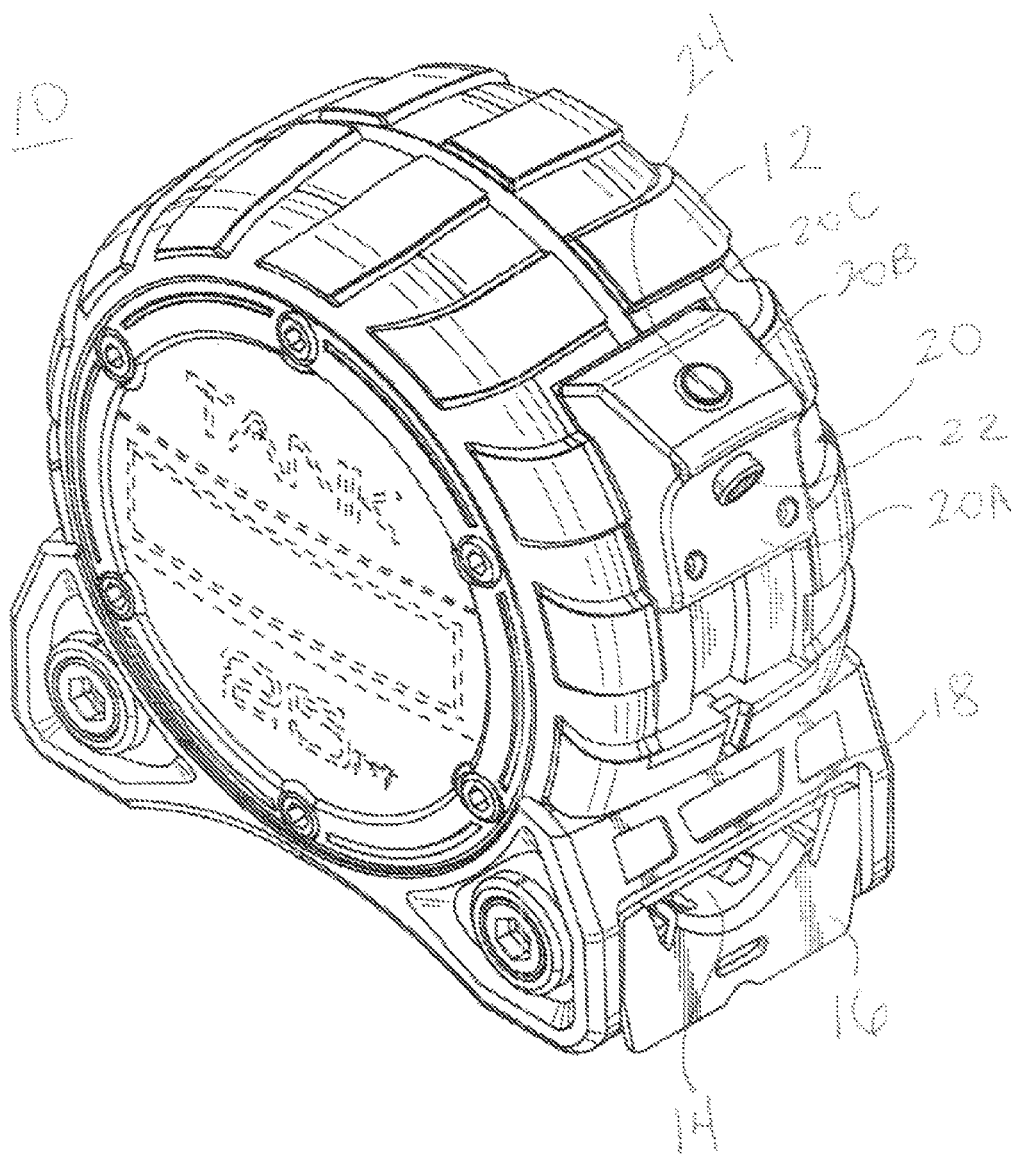
FIG. 1 illustrates an exemplary illuminated tape measure.

With reference to FIG. 1, the following describes an improved, illuminated tape measure 10. As is conventional, the tape measure comprises a body portion 12 in which is disposed a measuring tape or blade 14 which is calibrated in inches, centimeters, and or the like. The measuring tape 14 terminates with a hook 16. Within the interior of the body portion 12, the measuring tape 14 is associated with a spring which functions to retract the measuring tape 14 into the body portion 12 when the measuring tape 14 is extended from a slot 18 formed in the housing. As will be appreciated, the hook 16 also functions to prevent the measuring tape 14 from being drawn completely into the interior of the body portion 12 via the retracting force of the spring. When the measuring tape 14 is extended from the body portion 12, a locking mechanism is provided to lock the measuring tape 14 in an extended position against the retracting force of the spring. Because those of ordinary skill in the art will appreciate that the components which enable movement of the measuring tape 14 between an extended position and a retracted position relative to the body portion 12 and which enable locking of the measuring tape 14 in an extended position may be components such as disclosed in the previously incorporated references, for the sake of brevity these components need not be further described herein in greater detail.

For controlling the locking mechanism, the body portion 12 has mounted thereon a moveable lock actuator 20. As particularly illustrated in FIG. 1, the lock actuator 20 is positioned on a front face of the body portion 12 above the slot 18 where the lock actuator 20 is adapted to be slid relative to the body portion 12. To assist a user in sliding the lock actuator 20 relative to the body portion 12 to thereby cause the locking mechanism associated with the lock actuator 20 to lock and release the measuring tape 14, a lower end of the lock actuator 20 is provided with a generally arcuate surface 20a, i.e., a surface that can be interacted with by a thumb of the user to easily force the lock actuator 20 upward into a position that causes the blade locking mechanism to lock or engage the measuring tape 14, and the upper end of the lock actuator 20 is provided with an angled and/or flat surface 20b and/or 20c to assist a user in returning the lock actuator 20 to a position in which the blade locking mechanism unlocks or releases the measuring tape 14.

Further incorporated into the lock actuator 20 is an illuminating device 22, such as a light emitting diode ("LED") or the like. As shown in FIG. 1, the illuminating device 22 is preferably mounted to the lower end of the lock actuator 20 and the surface 20A of the lock actuator 20 and/or the arrangement of the illuminative device 22 when mounted to the lock actuator 20 may be such that the illuminating device 22 will function to generally illuminate the measuring tape 14 in the area adjacent to the slot 18. To this end, an appropriate lens may also be provided over the illuminating device 22. By way of example, when the slide-lock switch is in the LOCK mode and the LED light activated, the LED may be arranged to focus light at a 40 degree angle (as measure against vertical) down upon the tape whereby the measuring tape 14 is primarily illuminated in a location that spans from 1" to 4" outside the case with a focus of the light being on an area between 2" and 3" outside the case. It will be understood that, with such an arrangment, light may still illuminate the tape as far as 7" or 8" outside the case.

Figure 2:
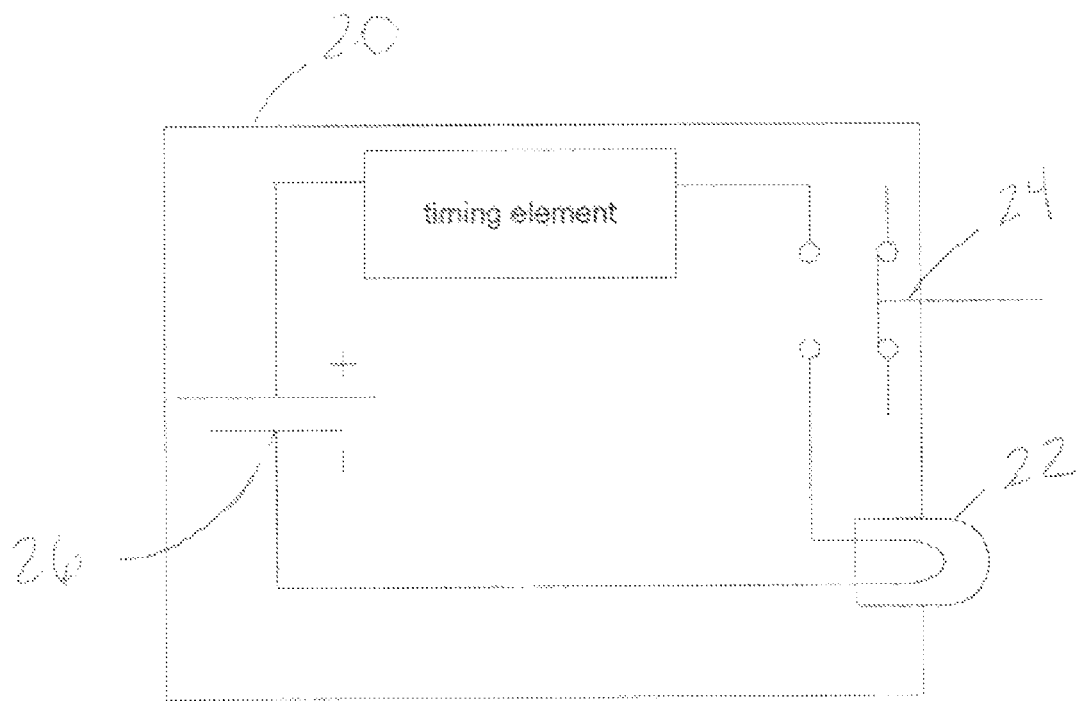
FIG. 2 illustrates a circuit diagram of an exemplary illuminating device usable in connection with the tape measure shown in FIG. 1.

For controlling activation of the illumination device 22, a depressible switch 24 may be mounted to the upper end of the lock actuator 20. For providing power to the illumination device 22, the lock actuator 20 additionally houses a battery 26 as further shown in FIG. 2. The switch 24 may be a toggle switch whereby the switch 24 is to be actuated to both connect the illumination device 22 to the battery 26 and disconnect the illumination device 22 from the battery 26 or the circuit may include a timing device, e.g., a digital count down timer, a capacitive timer, or the like, whereby the switch 24 need only be actuated to cause the illumination device 22 to be powered whereupon, after a given period of time, the illumination device 22 will no longer be provided with power. By way of example only, the system may be arranges such that the light times-out at a time between 15-30 seconds after each push of the button associated with the switch 24. In some instances, the circuit may be further modified to allow a user to adjust this time-out period, override this time-out period, and the like.

While specific examples of a tape measure have been described in detail, it will be appreciated by those skilled in the art that various modifications and alternatives to those details could be developed in light of the overall teachings of this disclosure. For example, while the lock actuator 20 is described in the context of a sliding actuator, it will be appreciated that other types of lock actuators may be used to engage with any provided locking mechanism. Similarly, it will be appreciated that other shapes may be provided to the lock actuator 20 as needed to facilitate user interaction therewith. Accordingly, the particular arrangements disclosed are meant to be illustrative only and not limiting as to the scope of the invention which is to be given the full breadth of the appended claims and any equivalents thereof.

What is claimed is:

1. A tape measure, comprising:
   a housing having an opening;
   a measuring tape retractably carried within the housing and extendable via the opening;
   a locking mechanism for maintaining the measuring tape in an extended position relative to the housing, the locking mechanism including a lock actuator mounted to the housing, the lock actuator comprising at least one exterior surface; and
   an illumination device mounted on or at least partially within the at least one exterior surface of the lock actuator.

2. The tape measure as recited in claim 1, wherein the illumination device comprises a light emitting diode (LED).

3. The tape measure as recited in claim 2, wherein the light emitting diode is arranged on or at least partially within the at least one exterior surface of the lock actuator to illuminate the measuring tape in an area adjacent to the opening.

4. The tape measure as recited in claim 2, comprising a user activatable switch for causing power to be selectively provided to the LED, wherein the user activatable switch is mounted to the at least one exterior surface of the lock actuator.

5. The tape measure as recited in claim 4, wherein the switch comprises a toggle switch.

6. The tape measure as recited in claim 4, wherein the illumination device comprises a timer whereby power is selectively provided to the LED for a given period of time determined by the timer upon user activation of the switch.

7. The tape measure as recited in claim 4, wherein the at least one exterior surface comprises a lower surface portion and an upper surface portion, and wherein the LED is mounted to or at least partially within the lower surface portion of the lock actuator and the switch is mounted to the upper surface portion of the lock actuator.

8. The tape measure as recited in claim 7, wherein the lower surface of the lock actuator has a generally arcuate shape.

9. The tape measure as recited in claim 8, wherein the lock actuator is slidably mounted to the housing.

10. A tape measure, comprising:
    a housing having an opening;
    a measuring tape retractably carried within the housing and extendable via the opening;
    a locking mechanism for maintaining the measuring tape in an extended position relative to the housing, the locking mechanism including a lock actuator mounted to the housing, the lock actuator comprising at least one exterior surface;
    a light emitting diode (LED) arranged on or at least partially within the at least one exterior surface of the lock actuator to illuminate the measuring tape in an area adjacent to the opening; and
    a user activatable switch for causing power to be selectively provided to the LED, wherein the user activatable switch is mounted to the at least one exterior surface of the lock actuator.

11. The tape measure as recited in claim 10, wherein the lock actuator is slidably mounted to the housing.

12. The tape measure as recited in claim 10, comprising a lens mounted over the LED.

* * * * *